(12) United States Patent
Terzis et al.

(10) Patent No.: US 9,935,730 B1
(45) Date of Patent: Apr. 3, 2018

(54) SYSTEMS AND METHODS FOR USING RADIO LAYER INFORMATION TO ENHANCE NETWORK TRANSFER PROTOCOLS

(71) Applicant: Google Inc., Mountain View, CA (US)

(72) Inventors: Andreas Terzis, Mountain View, CA (US); Ankur Jain, Mountain View, CA (US); Hao Du, San Jose, CA (US); Feng Lu, La Jolla, CA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 14/275,120

(22) Filed: May 12, 2014

(51) Int. Cl.
*H04L 1/00* (2006.01)
*H04W 28/02* (2009.01)

(52) U.S. Cl.
CPC ....... *H04L 1/0002* (2013.01); *H04W 28/0273* (2013.01); *H04W 28/0289* (2013.01)

(58) Field of Classification Search
CPC .................................................... H04L 1/0002
See application file for complete search history.

(56) References Cited

U.S. PATENT DOCUMENTS

| | | | |
|---|---|---|---|
| 6,298,070 B1 | 10/2001 | Carlson et al. | |
| 6,889,050 B1 | 5/2005 | Willars et al. | |
| 7,953,870 B1 | 5/2011 | Reeves et al. | |
| 8,009,697 B2 | 8/2011 | Peeters et al. | |
| 2002/0012334 A1* | 1/2002 | Strawczynski | H04B 1/7075 370/337 |
| 2002/0129159 A1 | 9/2002 | Luby et al. | |
| 2005/0272452 A1 | 12/2005 | Khoury et al. | |
| 2006/0173860 A1 | 8/2006 | Ikebe et al. | |
| 2007/0173270 A1 | 7/2007 | Block et al. | |
| 2007/0195820 A1 | 8/2007 | So et al. | |
| 2008/0181259 A1 | 7/2008 | Andreev et al. | |
| 2009/0142055 A1 | 6/2009 | Qiu et al. | |
| 2009/0310599 A1 | 12/2009 | Seol et al. | |
| 2012/0218899 A1 | 8/2012 | Ozawa | |
| 2013/0166620 A1 | 6/2013 | Branson et al. | |
| 2013/0297815 A1 | 11/2013 | Ma | |
| 2014/0022974 A1 | 1/2014 | Eriksson et al. | |
| 2014/0115150 A1 | 4/2014 | Ewanchuk et al. | |
| 2014/0155028 A1 | 6/2014 | Daniela et al. | |
| 2014/0293823 A1* | 10/2014 | Lee ...................... H04W 80/02 370/252 |
| 2014/0378149 A1 | 12/2014 | Lau et al. | |

(Continued)

OTHER PUBLICATIONS

U.S. Appl. No. 14/310,739, filed Jun. 20, 2014.

(Continued)

*Primary Examiner* — Huy D Vu
*Assistant Examiner* — Teisha D Hall
(74) *Attorney, Agent, or Firm* — McDermott Will & Emery LLP

(57) ABSTRACT

Systems and methods for using radio layer information to enhance network transport protocols are provided. Channel characteristics are obtained from a radio layer in a mobile device. The channel characteristics indicate the quality of a connection between the mobile device and a base station. Based on the channel characteristics, a bandwidth of the connection between the mobile device and the base station is calculated. A server is instructed to transmit data to the mobile device at the data rate determined based on the determined bandwidth.

14 Claims, 6 Drawing Sheets

(56) References Cited

U.S. PATENT DOCUMENTS

| | | |
|---|---|---|
| 2015/0103766 A1 | 4/2015 | Miklos et al. |
| 2015/0236938 A1* | 8/2015 | Thapliya ............ H04L 43/0894 370/232 |
| 2015/0257035 A1 | 9/2015 | Grinshpun et al. |
| 2015/0358483 A1 | 12/2015 | Jeong et al. |

OTHER PUBLICATIONS

US Office Action on U.S. Appl. No. 14/310,739 DTD Feb. 24, 2016.
Applicant-Initiated Interview Summary dated May 20, 2016 in U.S. Appl. No. 14/310,739 (5 pages).
Office Action dated Aug. 25, 2016 in U.S. Appl. No. 14/310,739 (50 pages).
Office Action dated Apr. 21, 2017 in U.S. Appl. No. 14/310,739.

\* cited by examiner

US 9,935,730 B1

SYSTEMS AND METHODS FOR USING RADIO LAYER INFORMATION TO ENHANCE NETWORK TRANSFER PROTOCOLS

FIELD OF THE INVENTION

The system and methods described herein generally relate to mobile communications, and, more specifically, to mobile communication rate control.

BACKGROUND

Mobile devices communicate with networks via radio communication with base stations. Network transport protocols are used to deliver data between two applications over a network such as the internet. The transmission control protocol (TCP) is the most commonly used network transport protocol. TCP allows reliable delivery of data over a computer network, for example, the Internet. A TCP sender adjusts its sending rate to avoid continuously overloading the network. TCP is robust and efficient for wired networks. In cellular networks, the bandwidth can change rapidly. The congestion avoidance process provided by TCP often cannot react quickly enough to optimize the transfer rate. This inefficiency can be costly for cellular carriers and prevents increased quality of service for end-users.

SUMMARY

One aspect of the present disclosure is directed to a method of data communication rate control. Channel characteristics are obtained from a radio layer in a mobile device. The channel characteristics indicate the quality of a connection between the mobile device and a base station. Based on the channel characteristics, a bandwidth of the connection between the mobile device and the base station is calculated. A server is instructed to transmit data to the mobile device at the data rate determined based on the determined bandwidth.

Another aspect of the present disclosure is directed to computer readable media storing processor executable instructions which when carried out by one or more processors cause the processors to obtain channel characteristics from a radio layer in a mobile device. The channel characteristics indicate the quality of a connection between the mobile device and a base station. The instructions further cause the processors to calculate a bandwidth of the connection between the mobile device and the base station based on the channel characteristics and instruct a server to transmit data to the mobile device at a data rate determined based on the determined bandwidth.

Another aspect of the present disclosure is directed to a method of data communication rate control. Channel characteristics are obtained from a radio layer in a mobile device. The channel characteristics indicate the quality of a connection between the mobile device and a base station. Based on the channel characteristics, a data rate for data to be transmitted from a server to the mobile device. A server then transmits data to the mobile device at the data rate determined based on the determined bandwidth.

Another aspect of the present disclosure is directed to computer readable media storing processor executable instructions which when carried out by one or more processors cause the processors to obtain channel characteristics from a radio layer in a mobile device. The channel characteristics indicate the quality of a connection between the mobile device and a base station. The instructions further cause the processors to calculate a data rate for data to be transmitted from a server to the mobile device based on the channel characteristics. The instructions further cause a server to transmit data to the mobile device at the data rate.

BRIEF DESCRIPTIONS OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are descriptions of various concepts related to, and implementations of, methods and systems for using radio layer information to enhance network transport protocols in mobile networks. The various concepts introduced above and discussed in greater detail below may be implemented in any of numerous ways, as the described concepts are not limited to any particular manner of implementation. Examples of specific implementations and applications are provided primarily for illustrative purposes.

The present disclosure is directed generally to using radio layer information to control data rates for transmission of content in mobile networks. Mobile devices communicate with servers connected to a network to receive data. This communication is facilitated through the radio communication between a mobile device and a base station that is connected to the network. The bandwidth available for the receipt and transmission of data by the mobile device over the network is affected by the quality of the connection between the base station and the mobile device as well as the cellular network conditions, including congestion of the cellular channels. Both of these factors can change rapidly. Commonly used protocols for transport of data from a server to a mobile device are not designed to respond to changes in available bandwidth as rapidly as the available bandwidth can change. This can result in under-utilization of network resources available for data transport or undue congestion of the network. Both under-utilization of available bandwidth and packet loss from undue congestion can result in costly inefficiencies for cellular service providers and content providers. For example, extra congestion can result in packet loss, a need for larger buffers, and more base station-to-network bandwidth than needed. Large buffers can result in larger network latencies and higher costs for the network equipment. Delivery of content to an application on the mobile device can suffer from under-utilization of network resources that decreases the quality of service experienced by end users.

Figure 1:
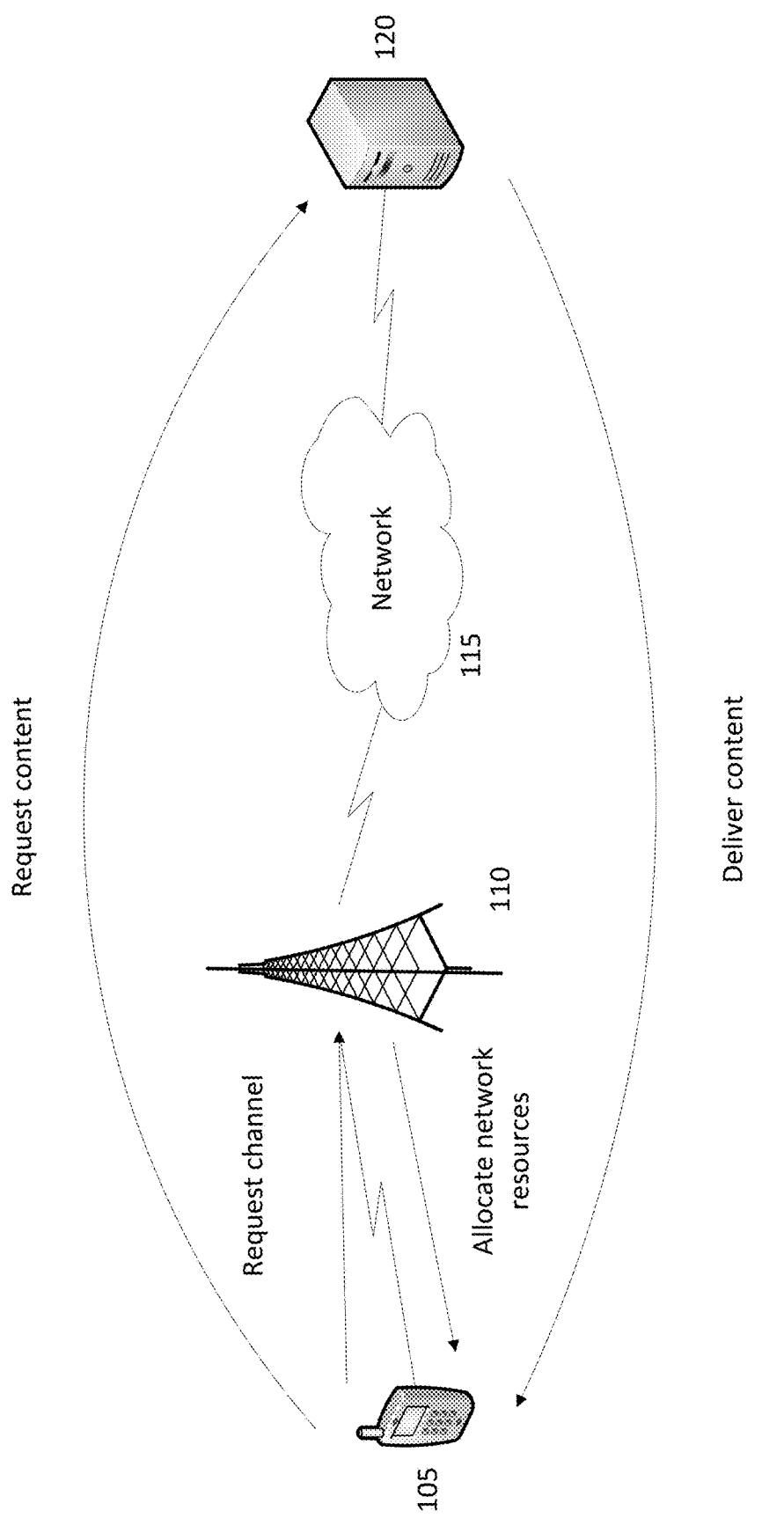
FIG. 1 is a block diagram of a mobile device in communication with a server connected to a network.

FIG. 1 depicts a mobile device 105 in communication with a server 120 in a network 115. The mobile device 105 transmits and receives information with the server 120 through a base station 110. The base station 110 is in radio communication with the mobile device 105 and is also in communication with the network 115.

The mobile device 105 can be a phone, tablet, computer, e-reader, smart-watch or other device capable of communication over a mobile network 115. The mobile device 105 includes a radio layer that facilitates communication with the base station 110. The mobile device 105 also executes applications that present content retrieved from servers 120 to an end-user.

The term "radio layer" refers generally to a portion of the physical abstraction layer, and in some cases, a portion of the data link layer of the open systems interconnection (OSI) model that is associated with radio communication by the mobile device 105. The radio layer includes one or more radio antennas, a wireless transceiver and associated software that executes on the mobile device 105, providing a wireless communication link with the base station 110. The radio layer facilitates communication with the base station 110. The radio layer can perform signal processing functions that convert data into signals to be transmitted and vice versa for signals received.

The radio layer transmits and receives signals to facilitate exchange of data by the mobile device 105. The radio layer can receive and transmit data using one of a variety of commonly employed standards for radio communication. Examples of such standards include advanced mobile phone protocol (AMPS), time division multiple access (TDMA), code-division multiple access (CDMA), global system for mobile communication (GSM), long term evolution (LTE), High Speed Packet Access (HSPA), general packet radio services (GPRS) or universal mobile telecommunications system (UMTS) or other wireless communication protocols.

The mobile device 105 executes an application that retrieves content from a server 120. The content can be in any format that may be presented on a mobile device 105, for example, graphical, text, image, audio, video, etc. Content can be streamed via web pages or dedicated applications. Examples of applications or websites that stream content include YouTube, Spotify and NetFlix. Applications executed by the mobile device 105, as well as software that facilitates end-user interaction with an application are included in the OSI abstraction layer referred to as the "application layer."

The network 115 is used by the mobile device 105 to access content stored on one or more servers 120. The network 115 includes any number of computing devices (e.g., computer, servers, routers, network switches, etc.) that are configured to receive and/or transmit data. The network 115 includes any number of hardwired and/or wireless connections between the computing devices. The network 115 can be a local-area network (LAN), such as a company intranet, a metropolitan area network (MAN), a wide area network (WAN), an inter-network such as the Internet, or a peer-to-peer network, e.g., an ad hoc WiFi peer-to-peer network or a combination of such networks. The network 115 may be public, private, or a combination of public and private networks. The network 115 may include mobile telephone networks using any standards used to communicate among mobile devices 105, including the above mentioned wireless communication standards.

A server 120 can be a computing device configured to host a resource, such as a web page or other resource (e.g., streaming media, articles, comment threads, audio, video, graphics, search results, information feeds, etc.). Servers 120 provide content to mobile devices 105 and/or to other computing devices via the network 115. Servers 120 can be a computer server (e.g., a file transfer protocol (FTP) server, file sharing server, web server, etc.) or a combination of servers (e.g., a data center, a cloud computing platform, etc.). A server 120 can include any type of memory, media, or memory devices capable of storing content. For instance, servers 120 can include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, servers 120 are part of a data storage system capable of receiving and responding to queries from computing devices, including mobile devices 105. In some instances, content can be stored in a database and retrieved by a server 120 for transmission. Servers 120 can be located in data centers associated with the network 115. Data centers in the network 115 can be geographically dispersed. Content can be distributed across multiple servers 120. Servers 120 can be dedicated to specific content or content can be stored in a computer memory or database associated with the network 115 and accessed by servers 120.

An application on the mobile device 105 delivers content from the network 115 to an end user via the mobile device 105. The mobile device 105 requests content from the server 120 over the network 115. The request can be a sequence of data packets sent from the mobile device 105 to the server 120. The request can be in the form of one of many internet protocols such as HTTP, HTTPS, FTP, TELNET, one of any existing protocols encapsulated by another underlay protocol such as VPN, or any other protocol that the application running on the mobile device 105 and the server 120 understand. For example, the request can be a hypertext transfer protocol (HTTP) request that specifies a method for the interaction between the mobile device 105 and the server 120, for example, a "GET" method, and specifies the content to be retrieved, for example, by identifying a uniform resource identifier (URI). An HTTP request is an example of a protocol implemented at the application layer. Requests for communication with a server 120 for content are generally initiated by software executed at the application layer of the mobile device 105.

The server 120 receives the request for content from the mobile device 105 and transmits the requested content to the mobile device 105 over the network 115. The server 120 can send a response to the request message sent by the mobile device 105 upon receiving a request. An example of such a response is an HTTP response. Transmission of the content includes sending data packets, that are the basic unit of data transmission, over the network 115. In general, a sequence of the transmitted data packets is identified by the server 120 and when the data packets are received by the mobile device 105, the application uses the sequence to reconstruct the content. The application delivers the content to a user through a user interface.

The mobile device 105 communicates with servers 120 in the network 115 through a base station 110 (also referred to as a "cell tower" or a "base transceiver station"). The base station 110 includes one or more antennas and one or more radio transceivers that can receive and transmit information to the mobile device 105 and is connected to the network 115 and the wireless connection between the base station 110 and the mobile device 105. The base station 110 can also include control electronics, various signal processors and one or more power supplies. The base station 110 can be a permanent structure or can be a temporary station that is capable of being set up in different locations. A mobile network or cellular network can include a plurality of cells. Each cell includes a base station 110 for communication with mobile devices 105 being operated within the cell.

To communicate with the network 115 via the base station 110, the mobile device 105 requests a communication channel from the base station 110. The base station 110 and the mobile device 105 transmit and receive information from each other to determine the conditions of the channel between the mobile device 105 and the base station 110. The channel between the base station 110 and the mobile device 105 can be affected by multiple factors. Location of the mobile device 105 within a cell is one factor. In other words, the distance between the base station 110 and the mobile device 105 can affect the connection. In general, a greater distance between the base station 110 and the mobile device 105 results in a weaker connection. Radio frequency interference and physical obstacles are other factors that can affect the quality of the connection.

The base station 110 allocates network resources to a channel of communication with the mobile device 105 based on the conditions of the connection between the mobile device 105 and the base station 110 as well as network conditions. Network conditions include network congestion. For example, if the connection between the base station 110 and the mobile device 105 is poor, as indicated by channel characteristics, the base station 110 can deny the mobile device 105 a communication channel or it can allocate a channel with low bandwidth. Alternatively, if the connection between the base station 110 and the mobile device 105 is strong, the base station 110 will allocate a channel with a greater bandwidth.

Figure 2:
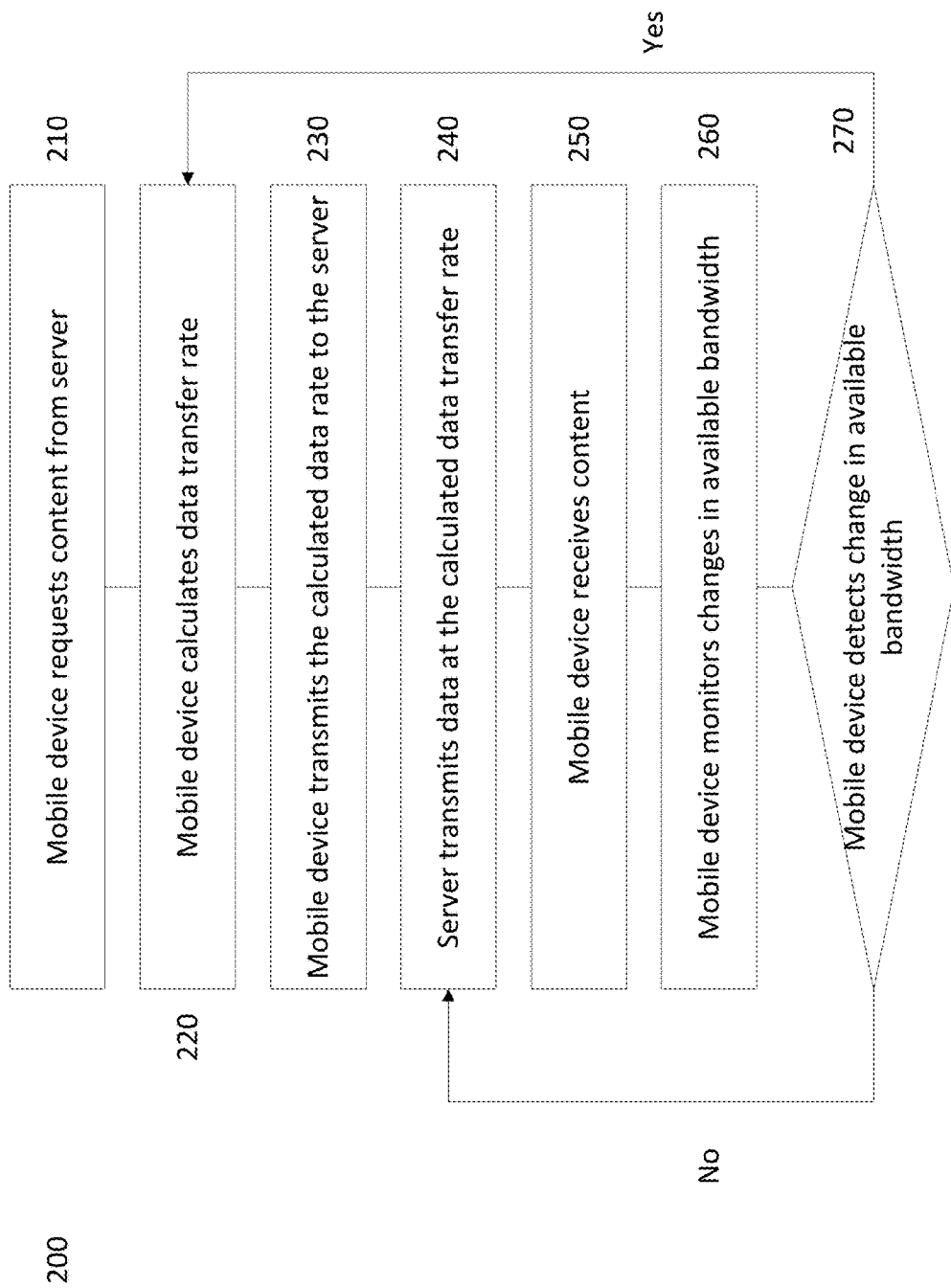
FIG. 2 is a flow diagram of an example method of using radio layer information to improve content delivery from a server to a mobile device over a network.

FIG. 2 is a flow diagram depicting a process 200 used by a mobile device 105 to receive content from a server 120 over a network 115 via the wireless connection between the base station 110 and the mobile device 105. The process begins with the mobile device 105 requesting content from a server 120 in the network 115 (step 210). The mobile device 105 determines a data rate for the content to be transmitted by the server 120 to the mobile device 105 (step 220). The mobile device 105 transmits the determined data rate to the server 120 (step 230). The server 120 transmits the content at the determined data rate (step 240). The mobile device 105 receives the content (step 250). The mobile device 105 detects changes in the available bandwidth (step 260). If the mobile device 105 detects a change in available bandwidth (decision box 270), the mobile device 105 determines a new data rate for the transmission of the content by the server 120 to the mobile device 105 (returning to step 220). The steps depicted in FIG. 2 indicate an example of the order that the steps may be carried out in. In some implementations, the mobile device 105 can calculate the data rate (step 220) before requesting content (step 210). In some implementations, the mobile device 105 can transmit the calculated data rate to the server (step 230) together with the request for content (step 210).

The process 200 includes the mobile device 105 requesting content from a server 120 in the network 115 (step 210). As mentioned above, the content can include audio, video, images, text or other content. The content can be in the form of a discrete file (e.g., via FTP) or streamed media. As described above, an example of a request message is an HTTP request. Other examples of request messages are a remote procedure call such as a JSON-RPC, a request using FTP, RTSP, or one of numerous other protocols, or a data packet or suitable form of message to a server 120.

The mobile device 105 determines a data rate for the transmission of the content by the server 120 to the mobile device 105 (step 220) by using channel characteristics. Channel characteristics are metrics that describe the channel quality between the base station 110 and the mobile device 105. Channel characteristics can describe a wideband channel, including metrics for the entire channel between the mobile device 105 and the base station 110. Channel characteristics can also be specific to sub-bands that the wideband channel is divided into. The channel characteristics can include a channel quality index (CQI), a discontinuous transmission and discontinuous reception communication availability fraction (DTX/DRX fraction) and/or other metrics of channel quality between the base station 110 and the mobile device 105. Both CQI and DTX/DRX fraction can be expressed as numerical values. CQI and DTX/DRX are used by the mobile device 105 to calculate a data rate for the transmission of content from a server 120 to the mobile device 105. A more detailed example of a determination of a data rate by the mobile device 105 is discussed below in reference to FIG. 3B.

The channel characteristics can include a CQI value. To allocate a channel to the mobile device 105, the base station 110 exchanges information with the radio layer of the mobile device 105. The channel quality index (CQI) is a value that is generated at the radio layer of the mobile device 105 and is transmitted from the mobile device 105 to the base station 110. CQI is a metric that is commonly used in establishing a communication channel between a base station 110 and a mobile device 105 and its implementations and specifications are described by various Third Generation Partnership Project (3GPP) standards. CQI values are reported to base stations as part of many standard communication protocols. The CQI value is an integer that can be dependent on a signal-to-interference-and-noise ratio (SNIR) or other channel conditions observed by the radio layer. The CQI value can be dependent on the standard used for radio communication. For example, in HSDPA, the CQI value is an integer between one and thirty that is dependent on SNIR. In LTE, by contrast, the CQI value is an integer between one and fifteen and is not directly dependent on SNIR. In general, a CQI value is a measure of channel quality between the mobile device 105 and the base station 110. According to some mobile communication standards, CQI values directly correlate different supportable modulation and coding schemes for data transmission and reception. A CQI value is generally lower when the mobile device 105 is further from the base station 110 and higher when the mobile device 105 is closer to the base station 110.

In addition to CQI, other values that describe the quality of the connection between the mobile device 105 and the base station 110 can be included in channel characteristics that are used to determine a data rate for transmission of content to the mobile device 105. Some examples of other values that can be included in channel characteristics are a pre-coding matrix indicator (PMI) and a rank indicator (RI). A PMI value indicates a pre-coding matrix that should be used for transmission of data to the mobile device 105 and a RI value indicates the number of layers and the number of different signal streams transmitted to the mobile device 105 by the base station 110. These, along with other indicators of channel quality, can be used instead of or in combination with CQI as channel characteristics for determining a data rate by the mobile device 105.

The channel characteristics can also include a DTX/DRX fraction. Discontinuous transmission (DTX) and discontinuous reception (DRX) are processes by which data is transmitted and received discontinuously by the mobile device 105. Transmission and reception of data may be alternately turned off and turned on for periods of time in a DTX/DRX cycle. DTX/DRX cycles can be used by mobile devices 105 to improve battery life of the mobile device 105 as less battery is used during periods where transmission and reception of data are discontinued. DTX/DRX cycles can also be used to mitigate congestion on the available cellular channels where there is communication by a base station 110 with multiple mobile devices 105. For example, a base station 110 can transmit data to multiple mobile devices 105 in alternating temporal frames to allow communication with multiple mobile devices 105. A DTX/DRX fraction describes the amount of time within each DTX/DRX cycle that transmission and reception are discontinued. Thus, a DTX/DRX fraction indicates availability of a communication channel between the mobile device 105 and the base station 110. If the DTX/DRX fraction is equal to zero, the connection between the base station 110 and the mobile device 105 is continuous and the mobile device 105 always has the ability to transmit and receive data from the base station 110. If the DTX/DRX fraction is equal to one, the connection between the base station 110 and the mobile device 105 is always discontinued and there is no communication between the base station 110 and the mobile device 105. The radio layer of the mobile device 105 generates a DTX/DRX fraction. The DTX/DRX fraction can be used as an indication of cellular channel congestion as higher DTX/DRX fractions are expected when the base station is actively communicating with more mobile devices.

The mobile device 105 transmits the determined data rate to the server 120 (step 230). The mobile device 105 can transmit the determined data rate by any of numerous methods, for example, the mobile device 105 can send a data packet indicating the determined data rate, a remote procedure call (RPC), a TCP header, or another suitable message to the server 120 that specifies the data rate. In some implementations, the mobile device 105 may embed the determined data rate in acknowledgement packets sent to the server 120. The server 120 receives the transmitted data rate and transmits the content at the data rate indicated by the mobile device 105 (step 240). The server 120 can implement a congestion control system to transmit the content to the mobile device 105. An example of a congestion control system is discussed further below and in reference to FIG. 5.

The mobile device 105 receives the content from the server 120 over the network 115 and the wireless connection between the base station 110 and the mobile device 105 at the determined data rate (step 250). By transmitting the content at the determined data rate, congestion at the base station 110 is less likely and risk of packet loss that may result in a need for retransmission is reduced. Decrease in quality of service experienced by the end user of the mobile device 105 due to the changing signal quality between the mobile device 105 and the base station 110 is reduced by adapting the data rate for transmission to the changes in signal quality.

The mobile device 105 checks for changes in available bandwidth (step 260). Factors like distance between the base station 110 and the mobile device 105, radio frequency interference, and physical obstacles that affect the connection quality can change rapidly. Network traffic conditions can also change rapidly in mobile networks. Due to the rapidly changing signal quality, the optimal bandwidth for transmission of content can change rapidly as well. To account for this, the mobile device 105 continuously or regularly monitors the available bandwidth it has for communication with the base station 110 (step 260). The mobile device 105 can check for changes in available bandwidth by monitoring changes in CQI and DTX/DRX values. The application, or, in some implementations, a component of the mobile device's transport layer, can retrieve the channel characteristics from the radio layer at specific intervals or upon certain conditions, for example, a change in the rate of packets received, or reception of packets out of sequence. When changes in signal quality, in the form of CQI, DTX/DRX fraction, other indicators of channel quality, or any combination thereof are detected, there is a change in available bandwidth.

If the mobile device 105 detects a change in available bandwidth for the transmission of content from the server (decision box 270), the mobile device 105 determines a new data rate (returning to step 220). In some implementations, the mobile device may continuously, or regularly, transmit a newly calculated bandwidth to the server. The new data rate is transmitted to the server and the server then transmits content at the new data rate. For example, in some implementations, a data rate can be embedded in every acknowledgement packet sent to the server 120 by the mobile device 105. Because the transmission of the determined bandwidth can be accomplished without significantly taxing the network resources, the server can change to the new data rate for transmission of content rapidly.

Figure 3A:
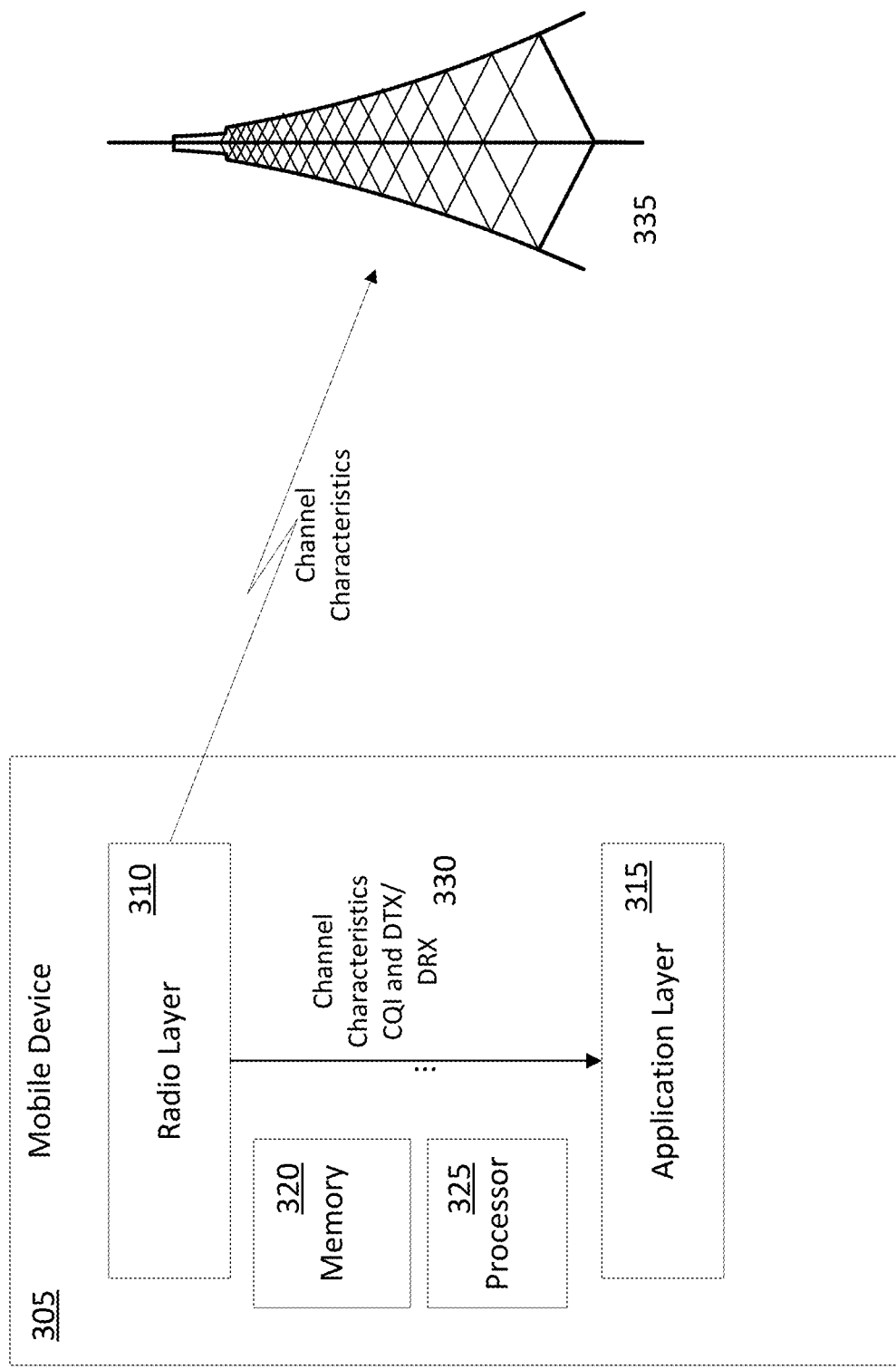
FIG. 3A is a block diagram of a mobile device in radio communication with a base station.

FIG. 3A is a block diagram depicting a mobile device 305 in communication with a base station 335. The mobile device 305 includes one or more processors 325, a memory 320, a radio layer 310 an application layer 315. To create a channel of communication between the base station 335 and the mobile device 305, the radio layer 310 of the mobile device 305 and the base station 335 exchange information, including channel characteristics 330. These channel characteristics 330 include a CQI value. The CQI value is used by the base station 335 to allocate a channel to the mobile device 305 and to determine appropriate modulation and coding schemes. Depending on the model used to describe the architecture of the mobile device 305, other abstraction layers, besides the radio layer 310 and the application layer 315 can be included. Some models, such as the OSI model include seven abstraction layers, while other models, such as the TCP/IP model include four layers. For purposes of illustration, only the application layer 315 and the radio layer 310 are shown. In some implementations, functions of the application layer 315 described herein can be implemented at other abstraction layers of the mobile device. Examples of other abstraction layers that, in some implementations, can perform the functions described in reference to the application layer 315 related to bandwidth and server data rate determination include the transport layer or the network layer.

As described above, channel characteristics 330, including CQI and DTX/DRX values, are generated by the radio layer 310 of the mobile device 305 based on communication with the base station 335. The channel characteristics 330, including a CQI value and a DTX/DRX fraction, are retrieved from the radio layer 310 by the application layer 315, or, in some implementations, the transport layer. The application layer 315 includes an application that presents content received from a server to the user. The application layer 315 determines a data rate for transmission of content by the server based on the retrieved CQI and DTX/DRX values. The determination of a data rate by the mobile device 305 is discussed further below in reference to FIG. 3B.

The transmission control protocol (TCP) is commonly used to transmit content from a server 120 to a mobile device 105. When using TCP to transfer content or data from a server 120 to a mobile device 105, the server 120 transmits data packets to the mobile device 105 and receives acknowledgment of receipt of the data packets from the mobile device 105. Based on the received acknowledgements, the server 120 calculates a congestion window that correlates to a data transmission rate. TCP assumes that packet loss is due to overload. The congestion window increases until packet loss is detected. When packet loss is detected, the congestion window is reduced, for example, by one half. The congestion window is again increased until packet loss is again detected and overload is assumed. TCP is vulnerable to rapid changes in available bandwidth as the process of data rate modulation and adjustment of the congestion window to achieve an optimal data rate takes a significant amount of time. An optimal bandwidth is not calculated prior to transmission but is determined by the sender based on packet acknowledgement. This can be inefficient because bottlenecks in data transmission rate can often lie between the base station 110 and the mobile device 105 which are not directly visible to the sender. This is due to frequently changing factors that affect the connection between the mobile device 105 and the base station 110. Because the data rate is indirectly determined at the server end based on the packet acknowledgements, the data rate does not change quickly enough to adapt to the rapidly changing connection between the base station 110 and the mobile device 105. Packet loss can also be due to other factors besides overload. For example, packet loss can occur due to a mobile device 105 moving from one cell to another, where the mobile device 105 changes the base station 110 it is communicating through while a packet is in transit. This can result in a false adaptation to overload when using TCP.

The presently disclosed systems and methods can modulate the server's data rate of transmission on the mobile device 105 end of the communication or by a server based on data obtained at the mobile device 105 end of the communication. The data rate can be modulated quicker and in a manner that is less prone to false overload due to packet loss. In some implementations, the systems and methods described herein can be used in combination with TCP, a modified version of TCP, or another protocol to improve the efficiency of data transmission. For example, the congestion windows of TCP may be used in combination with the presently disclosed systems and methods. In some implementations, presently disclosed systems and methods can be incorporated into a new protocol for data transfer to mobile devices 105.

Figure 3B:
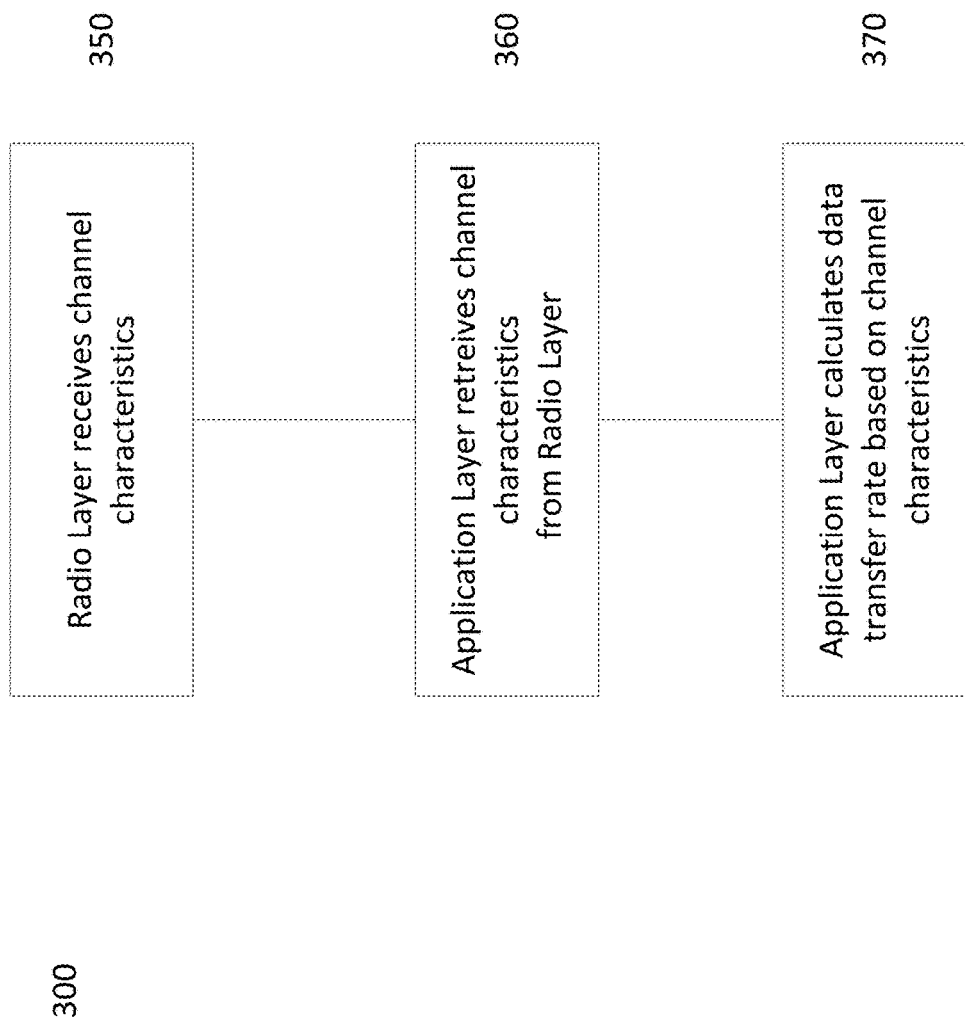
FIG. 3B is a flow diagram of an example method performed by a mobile device to determine a data rate for transmission of content from a server to the mobile device.

FIG. 3B is a flow diagram depicting a process by which a data rate is determined by the application layer 315 of a mobile device 305 (step 220). The radio layer 310 generates channel characteristics 330 (step 350). The application layer 315 retrieves channel characteristics 330 from the radio layer 310 (step 360) and the application uses the channel characteristics 330 to calculate a data rate (step 370).

The radio layer 310 generates channel characteristics 330 (step 350), including a CQI value and a DTX/DRX fraction. As discussed above, the channel characteristics 330 are metrics of the quality of the connection between the mobile device 305 and the base station 335 and other factors that can affect the channel between the base station 335 and the mobile device 305. A CQI value may be generated by the radio layer 310 at the time of establishing the connection with the base station 335. A DTX/DRX fraction can be generated by the radio layer 310 depending on a discontinuous transmission/reception cycle set by the mobile device 305, the base station 335, or a combination thereof. The mobile device 305 or the base station 335 can employ discontinuous transmission/reception cycle to affect battery life of the device. based on the quality of the connection between the base station 335 and the mobile device 305, or based on the level of concurrent communication activity of the base station 335 with other mobile devices in the cell, which may result in cellular channel congestion.

The application layer 315 of the mobile device 305 retrieves channel characteristics 330 from the radio layer 310 (step 360) and uses the channel characteristics 330 to calculate a data rate (step 370). To calculate the data rate, the application layer 315 uses a function that relates the desired data rate to be proportional to CQI and inversely proportional to DTX/DRX. Greater values for the CQI and lower values for the DTX/DRX fraction result in greater calculated data rates. As indicated above, several mobile communication standards directly correlate CQI values to modulation and coding rates, which in turn directly correlate to channel bandwidth. DTX/DRX values are indicative of the percentage of time a mobile device has access to that bandwidth. As such, in some implementations, the application layer sets the data rate to be proportional to the product of the bandwidth correlated to the CQI value and the DTX/DRX fraction. The data rate for transmission of data by the server 120 to the mobile device 105, in some implementations, is a function of the bandwidth calculated by the 3GPP standard using a CQI value, and the DTX/DRX fraction.

The determined data rate is transmitted to the server 120 by the mobile device 305 (step 230) and the server 120 transmits the content to the mobile device 305 at the determined data rate (240). In some implementations, the data rate generated at the application layer 315 can be used as a maximum data rate by the server 120. In such implementations, the server 120 can transmit data to the mobile device 305 at a data rate less than the maximum data rate, for example in response to detecting congestion in the network between the server 120 and the base station 335. As indicated above, the server 120 can implement a congestion control system to transmit the content at the determined data rate.

Figure 4:
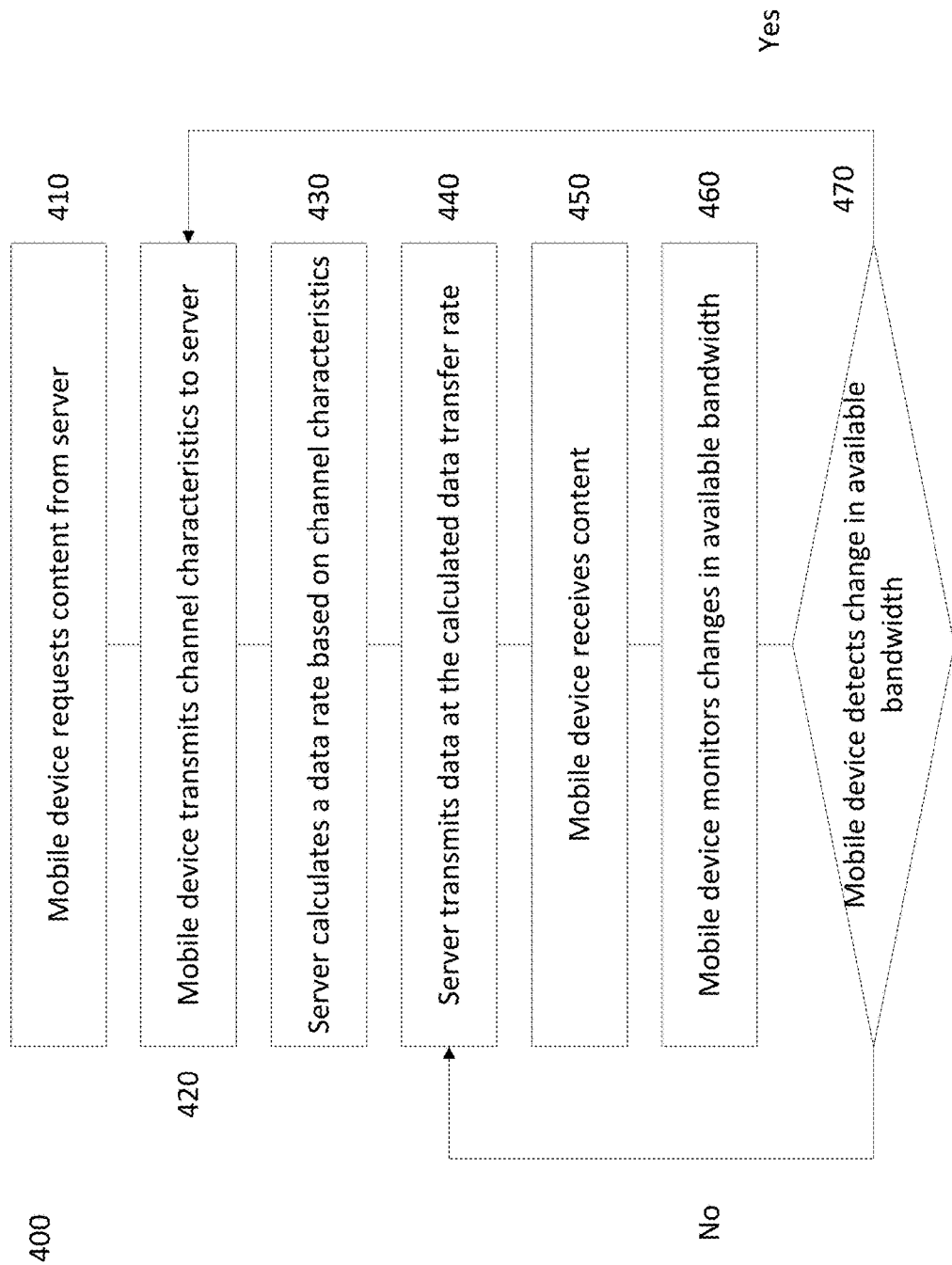
FIG. 4 is a flow diagram of an example method performed by a mobile device to determine a data rate for transmission of content from a server to the mobile device.

FIG. 4 is a flow diagram depicting a process 400 that can be used by a mobile device 105 to receive content from a server 120. The process begins with the mobile device 105 requesting content from a server 120 in the network 115 (step 410). The mobile device 105 transmits channel characteristics to the server 120 (step 420). Based on the transmitted channel characteristics, the server calculates a data rate for the content to be transmitted by the server 120 to the mobile device 105 (step 430). The server 120 transmits the content at the calculated data rate (step 440). The mobile device 105 receives the content (step 450). The mobile device 105 detects changes in the available bandwidth (step 460). If the mobile device 105 detects a change in available bandwidth (decision box 470), the mobile device 105 transmits new channel characteristics to the server 120 (returning to step 420) and the server calculates a new data rate based on the new channel characteristics (step 430).

The mobile device requests content from the server as described above, in reference FIG. 2 (step 410). As discussed, the content can be any form of discrete file or steamed media. The mobile device 105 transmits channel characteristics to the server 120 (step 420). The channel characteristics are retrieved from the radio layer, by an application, or a component of the transport layer, on the mobile device 105. Channel characteristics are described above in greater detail, in reference to FIG. 3B. The mobile device 105 can transmit the channel characteristics by any of numerous methods, for example, the mobile device 105 can send a data packet indicating the channel characteristics, a remote procedure call (RPC), or another suitable message to the server 120 that indicates the channel characteristics. In some implementations, the mobile device may embed the channel characteristics in one or more acknowledgement packets sent to the server.

The calculation of a data rate can be carried out by the server (step 430) in the same manner as the calculation of data rate by the mobile device 105 discussed above, in reference to FIG. 3B. In some implementations, the server may also use additional networking metrics observed by the server to calculate the data rate. Examples of such additional networking metrics includes packet loss-rate and round trip time (RTT). The server transmits the data to the mobile device 105 at the calculated data rate (step 440).

As discussed above, in reference to FIG. 3B, the mobile device 105 can monitor changes in available bandwidth for communication with the base station 110 continuously or regularly (step 460). For example, the mobile device 105 can check for changes in available bandwidth by monitoring changes in CQI and DTX/DRX values once every second.

If the mobile device 105 detects a change in available bandwidth for the transmission of content from the server 120 to the mobile device 105 (decision box 470), the mobile device 105 transmits new channel characteristics to the server (returning to step 420). In some implementations, the mobile device may continuously, or regularly, send channel conditions to the server. The server calculates a new data rate and transmits the data to the mobile device 105 at the new data rate. Because the transmission of the channel characteristics can be accomplished without significantly taxing the network resources, the server can change to the new data rate for transmission of content rapidly.

Figure 5:
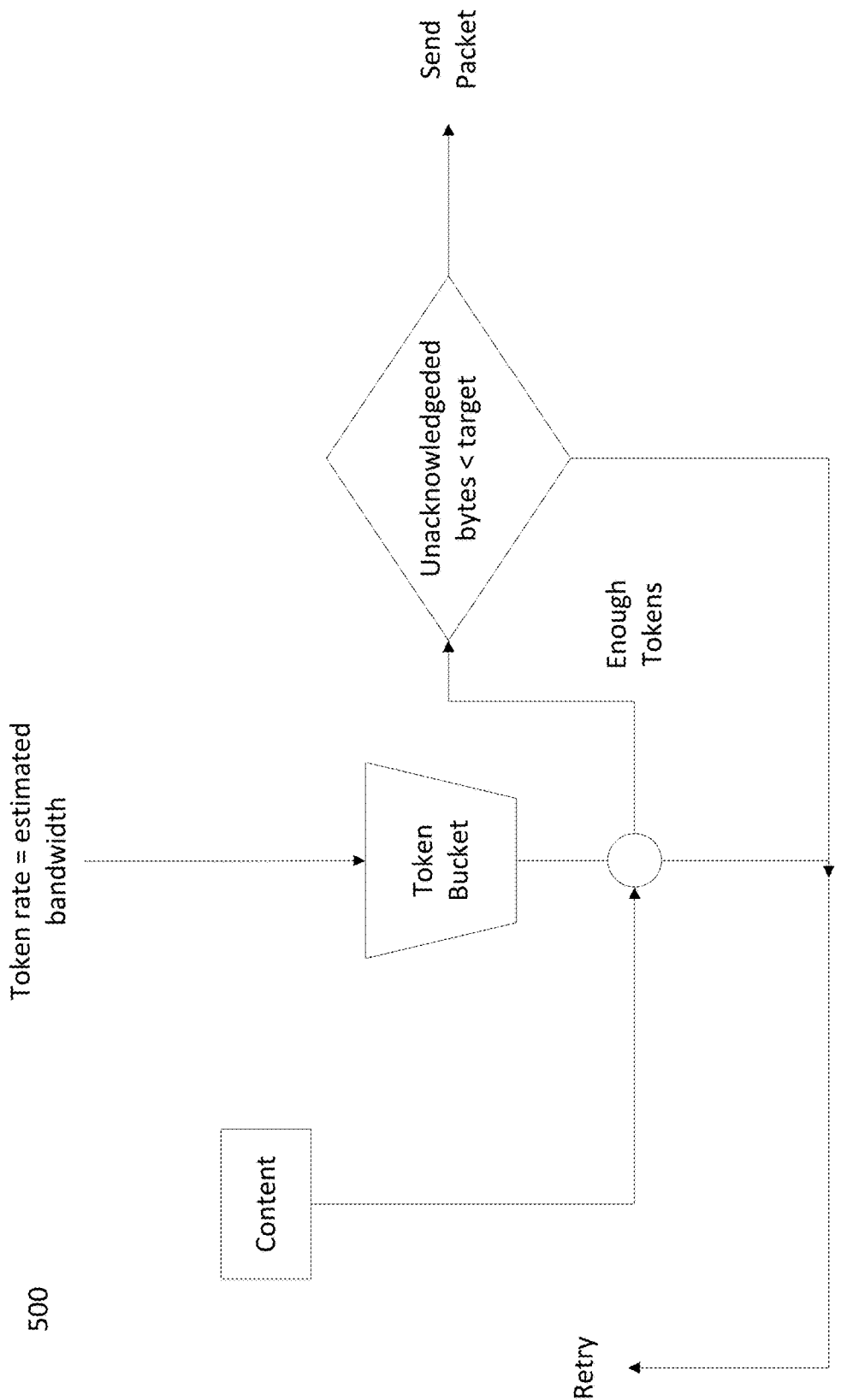
FIG. 5 is a schematic diagram of a process employed by a server to enforce a data rate provided by a mobile device.

FIG. 5 depicts an example of a congestion control system used by the server 120 to transmit content to the mobile device 105 at the data rate indicated by the mobile device 105. The congestion control system 500 includes a token bucket. The token bucket is a virtual reservoir for tokens that act as credits for sending packets from the server 120. The token bucket has a maximum capacity of tokens that can be defined (also referred to as "token bucket depth"). Tokens are added to the token bucket at the token rate. The token rate can be the data rate determined by the mobile device 105 or it can be proportional to the data rate determined by the mobile device 105. The content is transmitted in the form of data packets. The number of tokens in the token bucket is reduced for each packet sent. For example, the number of tokens in the token bucket can be reduced by one token for each packet, one token for each byte of data transmitted or by some other amount proportional to the amount of data transmitted by the server 120. If there are not enough tokens in the token buckets to send a data packet, the data packet is not sent and the server 120 retries the transmission until enough tokens have accumulated in the token bucket to transmit the packet. If there are enough tokens in the token bucket to send a data packet, the server 120 checks to make sure that the number of bytes of data that have not been acknowledged by the mobile device 105 (also referred to as "unacknowledged bytes") is below a threshold amount. If the number of unacknowledged bytes is equal to or greater than a threshold amount of unacknowledged bytes, the server 120 does not send the packet and retries until the amount of unacknowledged bytes is less than the threshold amount of unacknowledged bytes. If the amount of unacknowledged bytes is less than a threshold amount of unacknowledged bytes, the server 120 sends the packet to the mobile device 105. In some implementations, the above described congestion control system can be implemented as computer executable instructions executing on a processor at the server. The computer executable instructions can be included in the operating system on the server, a virtual machine operating system, a hypervisor on the server, or in a network interface controller at the server.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible and non-transitory.

The terms "computer," "computing device" or "processor" include all kinds of apparatus, devices, and machines for processing data, including by way of example a programmable processor, a computer, a mobile device 105, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

What is claimed is:

1. A method of data communication rate control, comprising:
   obtaining, by a mobile device, from a radio layer in the mobile device, channel characteristics indicating quality of a connection between the mobile device and a base station, the channel characteristics including a value for a Discontinuous Transmission (DTX) and Discontinuous Reception (DRX) communication availability fraction (DTX/DRX), wherein the DTX/DRX fraction indicates an availability of a communication between the mobile device and the base station;
   determining, at the mobile device based on the obtained channel characteristics, a bandwidth of the connection between the mobile device and the base station;
   calculating, by the mobile device based on the determined bandwidth, a data rate for transmitting data from a server remote from the base station to the mobile device; and
   sending, from the mobile device, an instruction to the server to transmit data to the mobile device at the calculated data rate.

2. The method of claim 1, wherein the channel characteristics include a Channel Quality Index (CQI) value.

3. The method of claim 1, wherein the mobile device sends the instruction to the server via a communication at the application layer of the Open Systems Interconnection (OSI) stack.

4. A non-transitory computer-readable medium storing processor executable instructions that, when executed by one or more processors, cause the one or more processors to:
   obtain, by a mobile device, from a radio layer in the mobile device, channel characteristics indicating quality of a connection between the mobile device and a base station, the channel characteristics including a value for a Discontinuous Transmission (DTX) and Discontinuous Reception (DRX) communication availability fraction (DTX/DRX), wherein the DTX/DRX fraction indicates an availability of a communication between the mobile device and the base station;
   determine, at the mobile device based on the obtained channel characteristics, a bandwidth of the connection between the mobile device and the base station;
   calculate, by the mobile device based on the determined bandwidth, a data rate for transmitting data from a server remote from the base station to the mobile device; and
   send, from the mobile device, an instruction to the server to transmit data to the mobile device at the calculated data rate.

5. The non-transitory computer-readable medium of claim 4, wherein the channel characteristics include a Channel Quality Index (CQI) value.

6. The computer readable media of claim 4, wherein the mobile device sends the instruction to the server via a communication at the application layer of the Open Systems Interconnection (OSI) stack.

7. A method of data communication rate control, comprising:
   obtaining, by a server remote from a base station, from a radio layer in a mobile device, channel characteristics indicating quality of a connection between the mobile device and the base station, the channel characteristics including a value for a Discontinuous Transmission (DTX) and Discontinuous Reception (DRX) communication availability fraction (DTX/DRX);
   calculating, at the server, a data rate for data to be transmitted from the server to the mobile device based on the obtained channel characteristics; and
   transmitting data from the server to the mobile device at the data rate.

8. The method of claim 7, comprising the mobile device transmitting the channel characteristics to the server.

9. The method of claim 7, wherein the channel characteristics include a Channel Quality Index (CQI) value.

10. The method of claim 7, wherein the mobile device obtains the channel characteristics and transmits the channel characteristics to the server at the application layer of the Open Systems Interconnection (OSI) stack.

11. A non-transitory computer-readable medium storing processor executable instructions that, when executed by one or more processors in a server, cause the one or more processors to:
   obtain, from a radio in a mobile device, channel characteristics indicating quality of a connection between the mobile device and a base station, the channel characteristics including a value for a Discontinuous Transmission (DTX) and Discontinuous Reception (DRX) communication availability fraction (DTX/DRX);
   calculate a data rate for data to be transmitted from the server to the mobile device based on the obtained channel characteristics; and
   transmit data from the server to the mobile device at the data rate.

12. The non-transitory computer-readable medium of claim 11, wherein the processor executable instructions, when executed, cause the one or more processors to receive the channel characteristics transmitted from the mobile device to the server.

13. The non-transitory computer-readable medium of claim 11, wherein the channel characteristics include a Channel Quality Index (CQI) value.

14. The non-transitory computer-readable medium of claim 11, wherein the processor executable instructions, when executed, cause the processors to obtain the channel characteristics and receive the channel characteristics at the server via a communication at the application layer of the Open Systems Interconnection (OSI) stack.

* * * * *